United States Patent
Flick

[15] 3,661,411
[45] May 9, 1972

[54] JOINT CONSTRUCTION
[72] Inventor: Kenneth E. Flick, New Brighton, Minn.
[73] Assignee: Jewell Manufacturing Company, St. Paul, Minn.
[22] Filed: Nov. 16, 1970
[21] Appl. No.: 89,750

[52] U.S. Cl. ..........................................287/103 A, 285/360
[51] Int. Cl. ...........................................................F16b 7/20
[58] Field of Search..................287/103 A, 2; 285/401, 402, 285/396, 360, 361

[56] References Cited

UNITED STATES PATENTS

| 176,769 | 5/1876 | Bradley | 285/360 |
| 778,936 | 1/1905 | Witmond | 285/360 |
| 279,267 | 6/1883 | Nock | 287/103 UX |
| 2,719,061 | 9/1955 | Beatty | 287/103 A X |
| 1,462,824 | 7/1923 | Reed et al. | 285/396 X |
| 2,477,818 | 8/1949 | Murdock | 287/103 UX |
| 1,762,572 | 6/1930 | Davidson | 287/103 A |

FOREIGN PATENTS OR APPLICATIONS

| 485,766 | 10/1953 | Italy | 285/401 |

*Primary Examiner*—Andrew V. Kundrat
*Attorney*—Frederick E. Lange and William C. Babcock

[57] ABSTRACT

A scaffold coupling of the bayonet joint type in which internal ridges in the female member are formed by depressing material inwardly to form ridges of the desired shape. The portion of the male member extending into the female member is of substantially the same external diameter as the internal diameter of the female member so that the two members are held firmly together. The male member may either be secured to a base plate or within a tubular member of the same external diameter as the female member. The male member may be formed by machining or casting.

3 Claims, 4 Drawing Figures

PATENTED MAY 9 1972
3,661,411
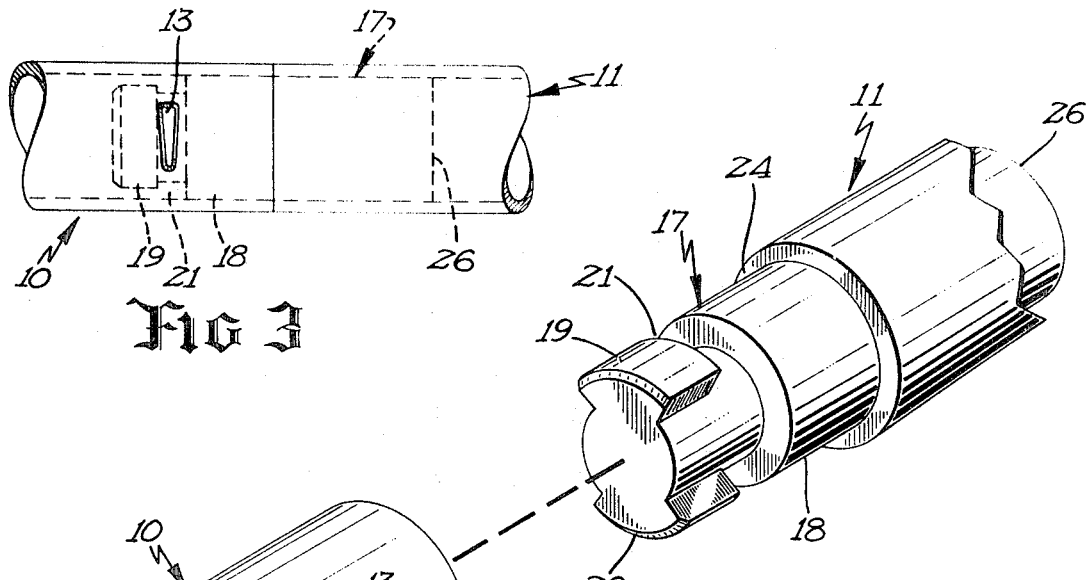
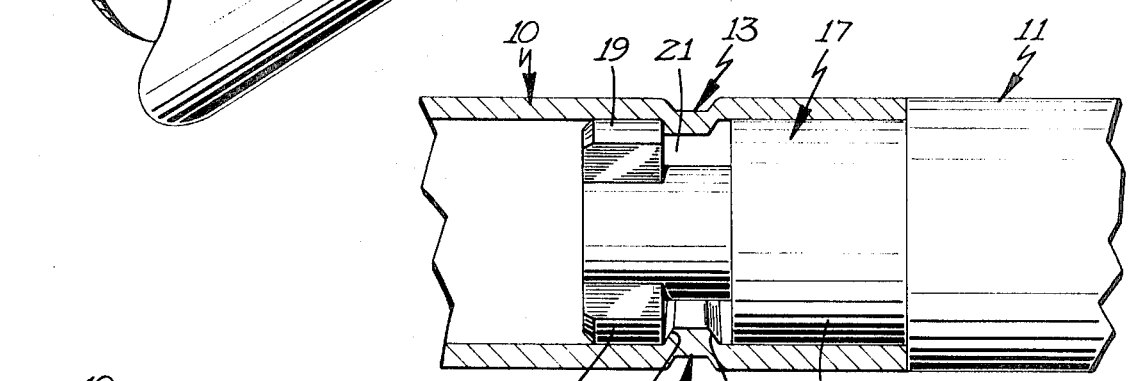
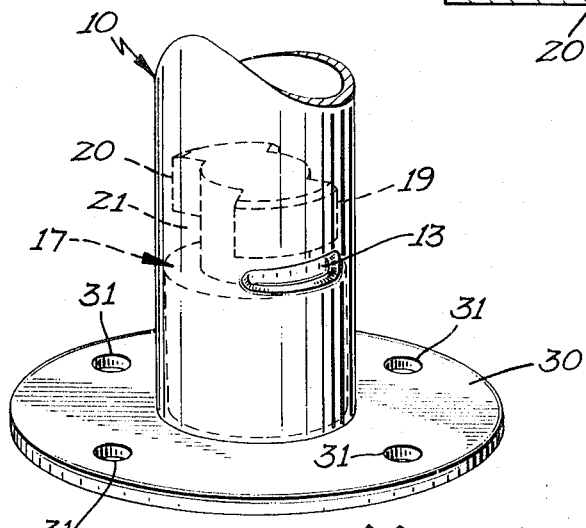
INVENTOR.
KENNETH E. FLICK
BY Frederick E. Lange
ATTORNEY

JOINT CONSTRUCTION

BACKGROUND OF THE INVENTION

In the scaffold art, it is very necessary to couple members together rather quickly and yet have a maximum amount of rigidity between the coupled parts. The coupling may be between two longitudinal sections of scaffolding or it may be between a scaffolding member and a base plate. In either case, it is very desirable that the coupling can be quickly made without the use of tools and that the members when coupled together be firmly held with respect to each other. Furthermore, it is desirable that the joint be made as inexpensively as possible.

One common type of joint that has been used for many years for detachably coupling members together is what is commonly referred to as a "bayonet joint." This joint essentially involves providing the two members to be joined with coacting external ears and internal ridges, either the ears or the ridges being inclined so that as the members are rotated with respect to each other, the ears are drawn into engagement with the walls of the ridges. Both the ears and the ridges are circumferentially spaced to permit the ears to pass between the ridges as one member is brought into coupling position with respect to the other.

While a bayonet joint is rather fast to assemble, it usually does not have sufficient rigidity for such applications as scaffolding. Where attempts have been made to make such a bayonet joint in such a manner as to have sufficient rigidity for scaffold use, it has usually resulted in the joint being of a relatively costly construction.

SUMMARY OF THE INVENTION

The present invention involves a relatively simple bayonet type of coupling adaptable for either fastening two tubular members together or for fastening a tubular member to a base plate. The couplings of the present invention employ internal ridges which are formed by depressing inwardly portions of the wall of one of the members. This has several distinct advantages. In the first place, the ridges are formed very inexpensively. In the second place, the internal walls of the ridges tend to be inclined. This, in turn, aids in the wedging action.

A further feature of my invention is that the male member which cooperates with the internal ridges has the same external diameter as the internal diameter of the tubular member in which the ridges are formed. Thus, the two portions fit firmly together and do not primarily rely for the rigidity of the joint on the clamping action between the internal ridges and the ears of the coupling. Rather, the latter primarily functions to hold the two members together.

The portion bearing the ears cooperating with the ridges is machined or cast and is secured to a second member of larger diameter which forms a shoulder against which the end of the tubular member is drawn as the joint is clamped. This member of larger diameter may be another section of tubing or it may be a base plate. Where the second member of larger diameter is a further tubular member, it preferably has the same external diameter as the first tubing member so that when the two tubular members are joined together, they form a continuous member without ridges or shoulder.

Other objects of the invention will become apparent from a consideration of the accompanying specification, claims and drawing.

BRIEF DESCRIPTION OF THE DRAWING

FIG. 1 is a perspective view of my coupling construction in which the two members are detached from each other;

FIG. 2 is an elevational view of the coupling construction of FIG. 1 with one member being shown in section;

FIG. 3 is an elevational view of the coupling construction of FIG. 1 on a somewhat smaller scale; and FIG. 4 is a perspective view of a modified form of my coupling in which on of the members is a base plate.

DESCRIPTION OF THE PREFERRED EMBODIMENT

Referring first to FIGS. 1, 2 and 3, the joint shown in these figures is one in which the two members to be coupled are both tubular. Only portions of the members are shown, these portions being the portions important as far as the joint construction is concerned. The two tubular members are designated by the reference numerals 10 and 11. The tubular member 10 acts as the female portion of the joint and has formed therein a pair of diametrically opposite, interiorly extending ridges 13 and 14. These ridges are formed by forcing in material of the pipe 10 along areas such as are illustrated in FIGS. 1 through 3 in connection with ridge 15. The cross-sectional configuration of ridges 13 and 14 is best shown in FIG. 2. It will be noted that the two opposed side walls of each of these ridges are inclined. This is due to the fact that in depressing the material to form the internal ridges 13 and 14, it would be undesirable to draw the materials sufficiently to have straight side walls. Furthermore, these inclined walls, designated in the case of ridge 14 by walls 15 and 16, are an advantage in securing a tight gripping relationship between the ridges 13 and 14 and the ears of the male member, as will be subsequently described.

Before proceeding further with the description of the ears 13 and 14, the male member of the joint will now be described. In the form shown in FIGS. 1 through 3 in which the member to be coupled to pipe 10 is a tubular conduit, the male member includes a part 17 which has an external diameter substantially equal to the internal diameter of tube 11. This member is forced into conduit 11 and held therein by reason of the force fit between the two members. The portion of coupling part 17 which is exposed and does not extend into pipe 11 has an external diameter close to but very slightly less than the interior diameter of pipe 10 so that the coupling part 17 can freely enter the pipe 10 and be turned with respect thereto. At the same time, by reason of the fact that the external diameter of coupling part 17 is approximately that of the interior diameter of pipe 10, the two pipe members 10 and 11 are held relatively rigid with respect to each other simply by reason of the snug fit of coupling member 17 into pipe 10. The exposed portion of coupling part 17 has a first annular portion 18 and two arcuate ears 19 and 20 which are arcuately spaced from each other by a distance greater than the arcuate extents of ears 13 and 14. At the same time, ears 19 and 20 are spaced from the annular portion 18 to form a groove 21 which is wider than the internal ridges 13 and 14 as best shown in FIGS. 2 and 3. The internal walls of ears 19 and 20 facing the annular portion 18 are preferably parallel to a plane perpendicular to the center line of the pipes 10 and 11 when they are coupled together. In other words, there is no taper to the interior walls of ears 19 and 20.

Turning back to the female member of the coupling and particularly to the ridges 13 and 14, it will be noted from FIGS. 1 and 3 that the internally facing walls of ridges 13 and 14 are inclined with respect to any circumferential line defining a plane perpendicular to the center line of pipe 10. In other words, these inner walls are tapered slightly. These are the walls which engage the ears 19 and 20. Thus, for example, the distance between the adjacent end of pipe 10 and any given point on the wall 15 of ridge 14 adjacent the base of wall 15 becomes progressively greater along the length of the ridge 14. This distance is selected so that its maximum value is somewhat in excess of the distance between the inner walls of ears 19 and 20 and the end of pipe 11 which forms a shoulder designated for convenience by the reference character 24. In clamping members 10 and 11 together, they are relatively rotated so that the male coupling part 17 is inserted into the pipe 10, the ridges 13 and 14 pass through the circumferential spaces between ears 19 and 20. The members are then relatively rotated with respect to each other to cause the ridges 13 and 14 to move along the inner walls of the ears 19 and 20. Initially, due to the inclination of the inner walls of ridges 13 and 14, there is no engagement between these inner walls and the ears 19 and 20. As the conduit 11 continues to be rotated with respect to conduit 10, the inner walls of ridges 13 and 14 engage the inner walls of ridges 19 and 20, moving pipes 10 and 11 together, finally forcing pipes 10 and 11 into abutting relationship. Since the distance between the inner wall 13 and the end of pipe 10 has a maximum value greater than the distance between the inner walls of ears 19 and 20 and the shoulder 24 formed by the end of pipe 10, the relative rotation of pipes 10 and 11 will stop before the ears 19 and 20 reach the "high points" of the ridges. At this point, pipe section 10 is held in firm abutment with pipe section 11. Due to the fact that the wall 15 of the ridge 14 and the corresponding wall of ridge 13 are inclined somewhat with respect to any plane vertical to the center axis of the pipes 10 and 11, the interior walls of ears 19 and 20 engage only a small portion of the inclined walls of ridges 13 and 14. This results in a tendency for the ears and ridges to bind together, due to the metal forming the wall 15 yielding slightly, so that the parts tend to remain in their clamped position.

The coupling member 17 may either be formed of steel which is machined to provide the annular portion 18 and the ears 19 and 20, or it may be formed by casting steel or malleable iron to produce a member having the shape of member 17. In either case, the finished unit is driven into the pipe 10 to be firmly retained therein. The coupling member 17 should be of sufficient length that it will be firmly supported in member 11. As shown in FIG. 3, the portion of member 17 projecting into the pipe 11 may have a length approximately equal to the diameter of the pipe. In this figure, the inner end of the coupling part 17 is shown by the dotted line 26. It will also be understood that the material of pipe 10 has sufficient strength and that the pipe 10 will be of sufficient thickness that the ridges 13 and 14 will retain their shape despite the forces exerted thereon during the clamping operation.

MODIFICATION OF FIGURE 4

In the modification of FIG. 4, the coupling member 17, instead of being secured within a second pipe, is rigidly secured as by welding to a base plate 30 which may have apertures 31 therethrough for the reception of bolts, screws or other fastening means for securing the base plate 30 to some fixed supporting surface. The coupling part 17 is identical to the coupling part 17 as far as the presence of ears 19 and 20 and the relationship of these ears to the ridge 13 formed in the tubular scaffold member 10. Coupling part 17 is, however, somewhat shorter than that of the modification of FIGS. 1 through 3 inasmuch as there is no portion extending into a second pipe, such as pipe 11. Thus, the only portion of coupling part 17 that is necessary in the modification of FIG. 4 is that portion which projects out of the pipe 11 in the modification of FIGS. 1 through 3.

It would be obvious that the base plate 30 functions in the same manner as the end of pipe 11 to provide a shoulder against which the pipe 10 is tightened as the pipe is rotated to cause the ridges 13 and 14 and ears 19 and 20 to force pipe 10 against base 30.

CONCLUSION

It will be seen that I have developed a bayonet joint type of coupling for use in assembling scaffolding sections which is extremely inexpensive to make and which holds the coupled members rigidly secured with respect to each other. While I have shown certain specific embodiments of my invention for purposes of illustration, it is to be understood that the scope of the invention is limited solely by the appended claims.

I claim as my invention:

1. A coupling comprising two cylindrical members, a first of which is tubular and has two circumferentially spaced inclined internal ridges formed by depressing inwardly portions of the tubular member so as to form depressions having side walls and a bottom contiguous with the wall of said tubular member and the second of which has two parts rigidly secured together, the first part of said second cylindrical member having an overall diameter corresponding to the inner diameter of said first tubular member and having a cylindrical portion secured to said second part which is of larger diameter to form a shoulder, said first part having two ears at the opposite end of said first part from said shoulder and spaced circumferentially from each other and longitudinally from said cylindrical portion to provide a cylindrical groove between said ears and said cylindrical portion, the circumferential space between said ears being greater than the length of said ridges of said first tubular member and the width of said groove being at least as great as the maximum width of said ridges, the inner walls of said ears being spaced from said shoulder by a distance approximately equal to the distance between the free end of said first tubular member and the walls of said ridges opposite to said free end so that when said second cylindrical member is inserted into said first tubular member, the ears can pass between the circumferential spaces between said internal ridges and upon relative rotation of said cylindrical members, the inner walls of the ears engage behind the adjacent walls of said internal ridges with the end of said tubular member engaging said shoulder of said second member, the walls of said internal ridges engaging said inner walls of the ears being inclined with respect to a circumferential line lying on a plane perpendicular to the center axis of said members so that as said members are relatively rotated, the end of the tubular member is drawn tightly against the shoulder of the second cylindrical member, and the opposed walls of each internal ridge being inclined toward each other as they extend inwardly from the inner wall of the tubular member in which they are formed and the wall of each ridge facing the adjoining ear being inclined radially with respect to the opposed wall of said ear so as to accentuate the wedging action between said ridges and the walls of said ears facing said ridges.

2. The coupling of claim 1 in which the second part of the second cylindrical member is a further tubular member which is to be coupled to said first tubular member and has an outside diameter substantially the same as the outside diameter of said first tubular member.

3. The coupling of claim 1 in which the second part of the second cylindrical member is a base plate which serves as a base to support in a vertical position said first tubular member when coupled to said first cylindrical member.

* * * * *